United States Patent [19]
Yonemitsu et al.

[11] Patent Number: 5,721,591
[45] Date of Patent: Feb. 24, 1998

[54] RECORDING DATA PRODUCTION APPARATUS AND METHOD, RECORDING MEDIUM REPRODUCTION APPARATUS AND METHOD, AND RECORDING MEDIUM

[75] Inventors: Jun Yonemitsu; Yasushi Fujinami; Makoto Kawamura, all of Kanagawa, Japan

[73] Assignee: Sony Corporation, Tokyo, Japan

[21] Appl. No.: 791,231

[22] Filed: Jan. 30, 1997

[30] Foreign Application Priority Data

Feb. 9, 1996 [JP] Japan ................... 8-023500

[51] Int. Cl.⁶ .................. H04N 5/783; H04N 5/92; G11B 7/00; G11B 7/24
[52] U.S. Cl. .................................. 348/423
[58] Field of Search ................ 348/423; 386/8, 386/27; 369/13, 47, 50, 54, 58, 60; H04N 5/783, 5/92

[56] References Cited

U.S. PATENT DOCUMENTS 5,418,762  5/1995  Kitayama .................. 369/13
5,471,450  11/1995  Yonemitsu .................. 369/60

*Primary Examiner*—Howard W. Britton
*Attorney, Agent, or Firm*—William S. Frommer; Alvin Sinderbrand

[57] ABSTRACT

The invention provides a a recording data production apparatus and method, a recording medium reproduction apparatus and method and a recording medium by which interruption of data can be prevented even when reproduction of data is performed in a different order from the order in which the data are recorded. When it is intended to allow reproduction of data in an order of a block A, a block B and a block D or in another order of the block A, a block C and the block D, in order to prevent underflow of data from a buffer memory of a reproduction apparatus, the block B is sectioned into sections $B_1$ to $B_3$ and the block C is sectioned into sections $C_1$ to $C_3$. Then, the lengths of the sections are set to a predetermined value, and the blocks are arranged in an order of the blocks A, $B_1$, $C_1$, $B_2$, $C_3$, $B_3$, $C_3$ and D. In each section, addresses of a jumping start point and a jumping destination are recorded as control information.

23 Claims, 13 Drawing Sheets

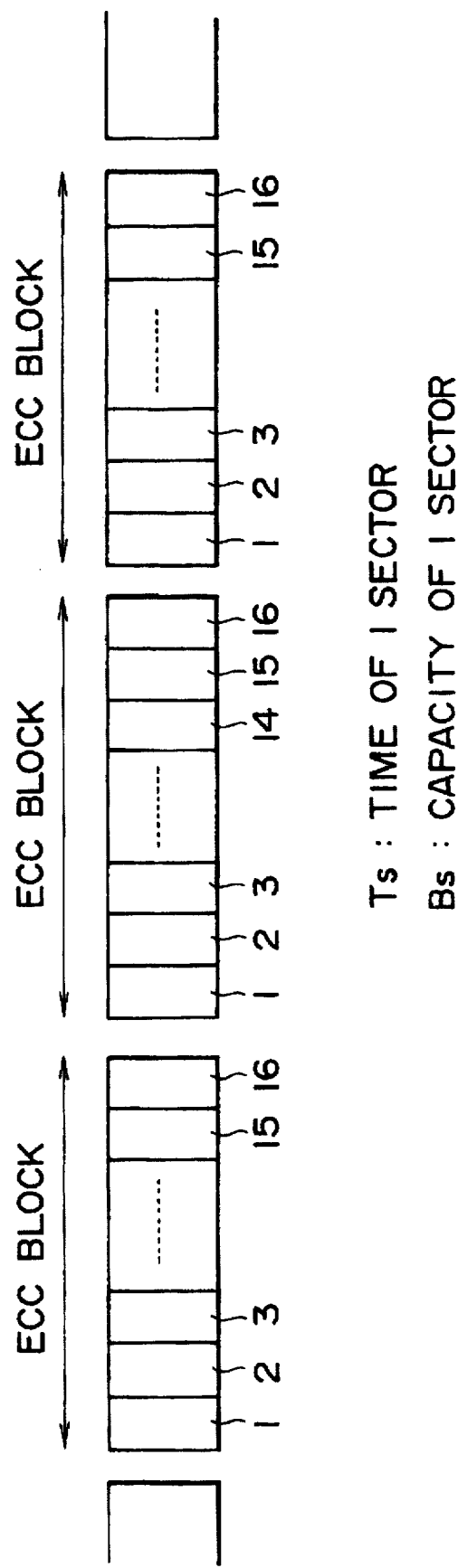

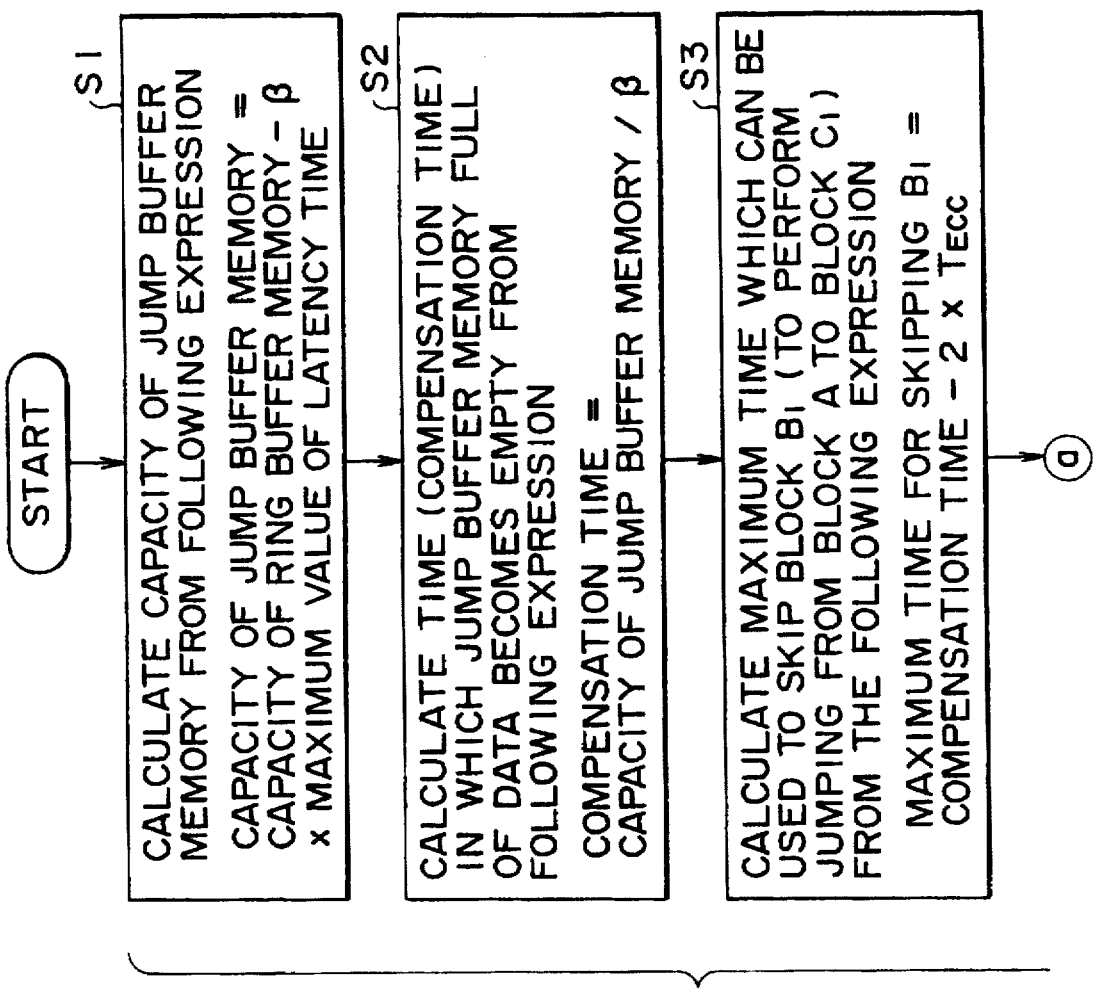

F I G. 11
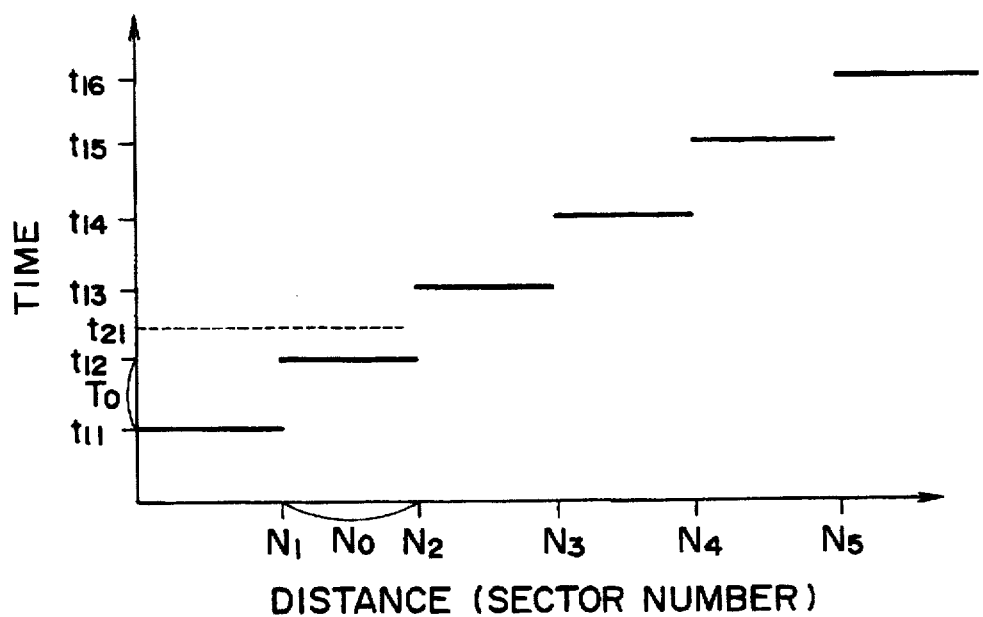
F I G. 12
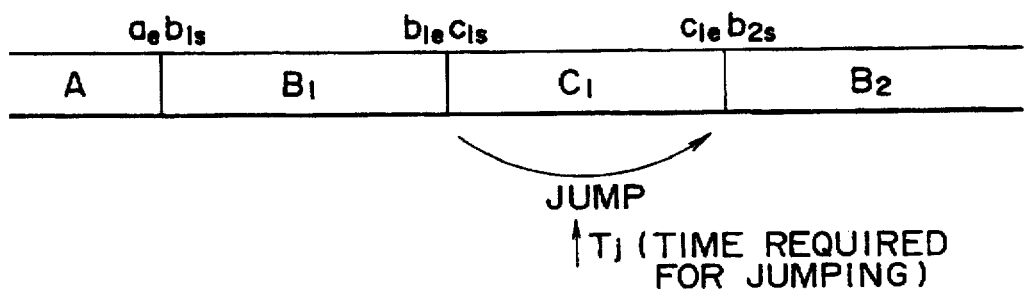
F I G. 13
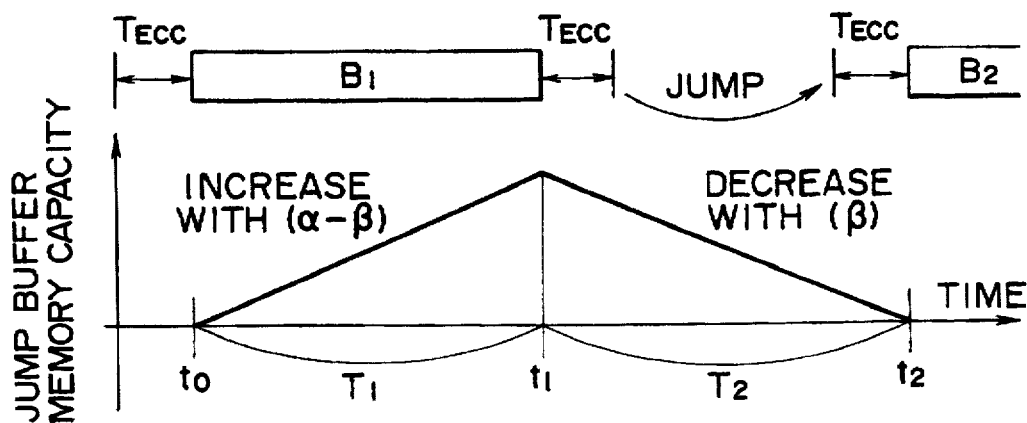

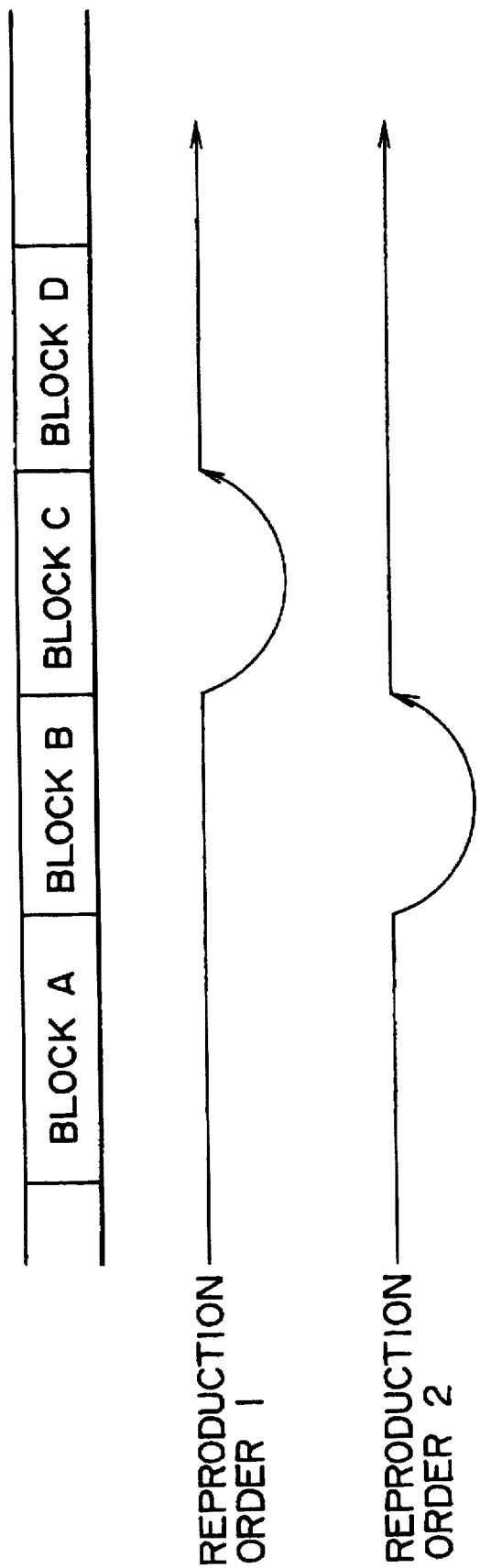

RECORDING DATA PRODUCTION APPARATUS AND METHOD, RECORDING MEDIUM REPRODUCTION APPARATUS AND METHOD, AND RECORDING MEDIUM

BACKGROUND OF THE INVENTION

This invention relates to a recording data production apparatus and method, a recording medium reproduction apparatus and method and a recording medium, and more particularly to a recording data production apparatus and method, a recording medium reproduction apparatus and method and a recording medium which allow data sectioned in a plurality of sections to be reproduced in a different order.

An encoder as a recording data production apparatus which produces data to be recorded onto a recording medium typically has such a construction as shown in FIG. 16. Referring to FIG. 16, a storage apparatus 10 stores video data to be recorded onto a recording medium such as an optical disk 20. The video data are read out from the storage apparatus 10 and inputted to a video encoder 11, by which the video data are encoded in accordance with the MPEG2 video standards. Meanwhile, audio data to be recorded onto a recording medium are stored in another storage apparatus 13. The audio data are read out from the storage apparatus 13 and supplied to an audio encoder 14, by which the audio data are encoded in accordance with the MPEG audio standards. A multiplexer 12 multiplexes the video data inputted thereto from the video encoder 11 and the audio data inputted thereto from the audio encoder 14 and outputs the multiplexed data.

A sector unit 16 divides the multiplexed data inputted thereto from the multiplexer 12 in units of data of 2,048 bytes into sectors, adds sector addresses to the sectors and outputs the sectors to an ECC encoder 17. The ECC encoder 17 collects the data in units of a sector supplied thereto from the sector unit 16 for 16 sectors to form an ECC block, adds redundancy data (ECC) for error correction to the ECC block and outputs the ECC block to a modulator 18. The modulator 18 modulates the data inputted thereto from the ECC encoder 17 and outputs them to a cutting machine 19. The cutting machine 19 cuts an optical disk 20 in accordance with the data inputted thereto.

In operation, video data stored in advance in the storage apparatus 10 are inputted to the video encoder 11, by which they are encoded in accordance with the MPEG2 video standards. In particular, the video data undergo DCT (discrete cosine transform) processing, quantization processing, VLC (variable length coding) processing and other necessary processing and are then outputted to the multiplexer 12. Meanwhile, audio data stored in advance in the storage apparatus 13 are inputted to the audio encoder 14, by which they are encoded in accordance with the MPEG audio standards. In particular, the audio data undergo DCT processing, quantization processing, VLC processing and other necessary processing and are then inputted to the multiplexer 12. The multiplexer 12 time division multiplexes the video data inputted thereto from the video encoder 11 and the audio data inputted thereto from the audio encoder 14 in accordance with the MPEG2 system standards to produce data in the form of a multiplexed stream.

The data outputted from the multiplexer 12 are inputted to the sector unit 16, by which they are divided into sectors each including data of 2,048 bytes and a sector address is added to each of the sectors. The resulting sectors are inputted to the ECC encoder 17. The ECC encoder 17 adds redundancy data for error correction to the data inputted thereto and outputs resulting data to the modulator 18. The modulator 18 modulates the data inputted thereto from the ECC encoder 17 and supplies the modulated data to the cutting machine 19.

The cutting machine 19 modulates light to be irradiated upon the optical disk 20 in accordance with the data inputted thereto from the modulator 18 to record the data onto the optical disk 20.

Then, the optical disk 20 is developed, and a stamper is produced using the optical disk 20 as an original disk. Then, a large number of replica disks are produced from the stamper.

FIG. 17 shows a typical construction of an optical disk apparatus for reproducing a replica disk produced in this manner. Referring to FIG. 17, a pickup 51 irradiates a laser beam upon an optical disk (replica disk) 50 and reproduces data recorded on the optical disk 50 from reflected light from the optical disk 50. Consequently, a reproduction signal in the form of a radio frequency (RF) signal is outputted from the pickup 51 and inputted to a demodulation circuit 52, by which it is demodulated. The demodulation circuit 52 outputs a demodulation output to a sector detection circuit 53 and an ECC circuit 56.

The sector detection circuit 53 detects a sector address from within the demodulation output inputted thereto from the demodulation circuit 52 and outputs the detected sector address to a control circuit 54 which may be formed from a microcomputer or a like element. The control circuit 54 receives a state signal designating a stored amount from a ring buffer memory 57. The control circuit 54 suitably controls a tracking servo circuit 55 in response to an output of the sector detection circuit 53 and an output of the ring buffer memory 57 so that the pickup 51 may be fed to a predetermined track position of the optical disk 50. An inputting section 61 is manually operated in order to input a predetermined instruction to the control circuit 54.

The ECC circuit 56 effects error correction processing of the demodulation output inputted thereto from the demodulation circuit 52 and outputs resulting data to the ring buffer memory 57. The ring buffer memory 57 temporarily stores the data inputted thereto from the ECC circuit 56 and outputs a state signal designating a stored amount of the data therein to the control circuit 54.

A demultiplexer 58 demultiplexes data read out from the ring buffer memory 57 in accordance with the MPEG system standards and outputs audio data to an audio decoder 59 while it outputs video data to a video decoder 60. The audio decoder 59 decodes (that is, performs inverse VLC processing, dequantization processing, inverse DCT processing and so forth of) the audio data inputted thereto in accordance with the MPEG audio standards and outputs resulting data to a loudspeaker or the like not shown. Meanwhile, the video decoder 60 decodes (that is, performs inverse VLC processing, dequantization processing, inverse DCT processing and so forth of) the video data inputted thereto in accordance with the MPEG2 video standards and outputs resulting data to a monitor apparatus not shown.

In operation, the pickup 51 irradiates a laser beam upon the optical disk 50 and reproduces data recorded on the optical disk 50 from reflected light of the laser beam from the optical disk 50. A reproduction signal outputted from the pickup 51 is inputted to the demodulation circuit 52, by which it is demodulated. The data demodulated by the demodulation circuit 52 are inputted to the sector detection circuit 53, by which a sector address is detected. The control circuit 54 discriminates a current position of the pickup 51 from the sector address supplied thereto from the sector detection circuit 53 and controls, when the current position is not a desired position, the tracking servo circuit 55 so that the pickup 51 is fed to a predetermined sector address position. Consequently, the data recorded at the predetermined position of the optical disk 50 are reproduced by the pickup 51.

The data outputted from the demodulation circuit 52 are inputted to the ECC circuit 56, by which detection and correction of errors of them are performed, and resulting data from the ECC circuit 56 are inputted to and stored into the ring buffer memory 57. The data stored in the ring buffer memory 57 are read out therefrom and inputted to the demultiplexer 58. The demultiplexer 58 demultiplexes the data inputted thereto into audio data and video data, and outputs the audio data to the audio decoder 59 and outputs the video data to the video decoder 60. The audio decoder 59 decodes the audio data inputted thereto and outputs resulting data to the loudspeaker not shown. Meanwhile, the video decoder 60 decodes the video data inputted thereto and outputs resulting data to the monitor apparatus not shown.

Each of the audio decoder 59 and the video decoder 60 outputs a code request signal to the control circuit 54 when decoding processing thereof is completed. The control circuit 54 controls the ring buffer memory 57 in response to the code request signals to read out data stored in the ring buffer memory 57 and output the thus read out data to the audio decoder 59 and the video decoder 60 via the demultiplexer 58.

The control circuit 54 monitors a state signal inputted thereto from the ring buffer memory 57 and controls the position of the pickup 51 via the tracking servo circuit 55 so that the ring buffer memory 57 may not overflow or underflow.

The input rate of data to the ring buffer memory 57 is set so that it has a value sufficiently higher than the output rate from the ring buffer memory 57. The ring buffer memory 57 has a capacity at least corresponding to a maximum latency time of the optical disk 50 (where the optical disk 50 is a constant linear velocity (CLV) disk, a capacity for one circumference on the outermost circumference) so that data of a variable rate inputted to the ring buffer memory 57 can be outputted continuously at a predetermined output rate.

Video data and audio data can be recorded and reproduced digitally onto and from the optical disk 50 in such a manner as described above.

With the system described above, however, data recorded on the optical disk 50 are successively reproduced in order, and there is a subject to be solved in that, in order to reproduce the data recorded on the optical disk 50 in a different order from the order in which the data are recorded on the optical disk 50, the inputting section 61 must be manually operated to designate an order of reproduction every time into the control circuit 54 of the optical disk apparatus.

Where video data are recorded, for example, as seen in FIG. 18, in the order of blocks A, B, C and D, it is sometimes desired to reproduce the block D skipping the block C after the block A and the block B are reproduced (reproduction order 1) or to successively reproduce the block C and the block D skipping the block B after the block A is reproduced (reproduction order 2).

It is assumed that, for example, images of the video data recorded in the block C include some image which is not very preferable to viewers of a predetermined age group. In such an instance, for viewers of the age group, it is preferable to effect reproduction in the reproduction order 1 so that images of the block C may not be reproduced.

Similarly, in such a case wherein it is not preferable to viewers of another age group to allow them to enjoy images of the block B, reproduction must be performed in the reproduction order 2 skipping the block B. Where the optical disk 50 is a digital video disk, a parental rate (ages for which enjoyment is permitted (inhibited)) can be recorded so that predetermined images may not be enjoyed by viewers of a predetermined age group in this manner. In particular, when the digital video disk is to be reproduced, if a viewer manually operates the inputting section 61 to input the age of the viewer itself, the system can inhibit reproduction of images which are not preferable to the age group of the age.

However, with the system, while a parental rate which represents that it is not preferable, for example, for the block C or B to be enjoyed by viewers of a predetermined age group can be recorded, since the length of the block C or B is an arbitrary length, if reproduction is performed skipping the block C or the block B as seen in FIG. 18, then the ring buffer memory 57 will underflow. Consequently, data are not temporarily supplied to the audio decoder 59 or the video decoder 60, and such a situation that some images are missed possibly occurs.

SUMMARY OF THE INVENTION

It is an object of the present invention to provide a recording data production apparatus and method, a recording medium reproduction apparatus and method and a recording medium by which interruption of data can be prevented even when reproduction of data is performed in a different order from the order in which the data are recorded.

In order to attain the object described above, according to an aspect of the present invention, there is provided a recording data production apparatus for producing data to be recorded onto a recording medium to be reproduced by a reproduction apparatus, comprising storage means for storing a capacity of a buffer memory of the reproduction apparatus for storing the data, input/output rates to and from the buffer memory, a speed in track jumping of a pickup of the reproduction apparatus when the data are reproduced from the recording medium, a latency time of the recording medium and a processing time relation information of an ECC, and sectioning means for sectioning the data in response to the storage of the storage means so that the reproduction apparatus may reproduce the data in an order different from an order in which the data are recorded on the recording medium.

According to another aspect of the present invention, there is provided a recording data production method for producing data to be recorded onto a recording medium to be reproduced by a reproduction apparatus, comprising the steps of storing in advance a capacity of a buffer memory of the reproduction apparatus for storing the data, input/output rates to and from the buffer memory, a speed in track jumping of a pickup of the reproduction apparatus when the data are reproduced from the recording medium, a latency time of the recording medium and a processing time relation information of an ECC, and sectioning the data in response to the stored information so that the reproduction apparatus may reproduce the data in an order different from an order in which the data are recorded on the recording medium.

In the recording data production apparatus and the recording data production method, data are sectioned in response to stored information such as the capacity of the buffer memory of the reproduction apparatus for storing data, the input/output rates to and from the buffer memory, the speed in track jumping of the pickup when the data are reproduced from a recording medium, the latency time of the recording medium and the processing time relation information of the ECC. Consequently, the data can be reproduced in an order different from an order in which the data are recorded on the recording medium without suffering from interruption.

According to a further aspect of the present invention, there is provided a recording data production apparatus which sections data into a plurality of sections and produces data to be recorded onto a recording medium to be reproduced by a reproduction apparatus so that the data of the sections may be reproduced by the reproduction apparatus in an order different from an order in which the data are recorded on the recording medium, comprising first calculation means for calculating a length of the sections necessary to prevent a buffer memory of the reproduction apparatus for storing the data from becoming empty within an interval within which a reproduction point is jumped to a next section, second calculation means for calculating a length of the sections necessary for data reproduced from the recording medium to be stored by a predetermined amount into the buffer memory, and determination means for determining a length of the sections from a result of the calculation of the first calculation means and a result of the calculation of the second calculation means.

According to a still further aspect of the present invention, there is provided a recording data production method wherein data are sectioned into a plurality of sections and data to be recorded onto a recording medium to be reproduced by a reproduction apparatus so that the data of the sections may be reproduced by the reproduction apparatus in an order different from an order in which the data are recorded on the recording medium are produced, comprising the steps of calculating a length of the sections necessary to prevent a buffer memory of the reproduction apparatus for storing the data from becoming empty within an interval within which a reproduction point is jumped to a next section, calculating a length of the sections necessary for data reproduced from the recording medium to be stored by a predetermined amount into the buffer memory, and determining a length of the sections from results of the two calculations.

In the recording data production apparatus and the recording data production method, a length of sections for prevention of the capacity of the buffer memory from becoming empty is calculated and another length of the sections is calculated from the capacity by which data are stored by a predetermined amount into the buffer memory, and then the length of the sections is determined from results of the two calculations. Consequently, the length of the sections can be determined rapidly with certainty.

According to a yet further aspect of the present invention, there is provided recording medium, having recorded thereon data which are sectioned in a plurality of sections such that the data of the sections can be reproduced by a reproduction apparatus in an order different from an order in which the data are recorded on the recording medium, the sections having a length determined corresponding to one of a value required to prevent a buffer memory of the reproduction apparatus for storing the data from becoming empty within an interval within which a reproduction point is jumped to a next section and another value necessary for data reproduced from the recording medium to be stored by a predetermined amount into the buffer memory.

In the recording medium, data are recorded thereon with a length of sections which is determined in response to one of a value calculated in order to prevent the buffer memory from becoming empty and another value calculated from a capacity which allows data to be stored by a predetermined amount into the buffer memory. Consequently, even where the order of reproduction is different from that in which the sections are recorded thereon, the recording medium assures prevention of otherwise possible missing of data upon reproduction.

According to a yet further aspect of the present invention, there is provided a recording medium reproduction apparatus for reproducing a recording medium on which data sectioned in a plurality of sections are recorded such that the data of the sections can be reproduced in an order different from an order in which the data are recorded on the recording medium, comprising reproduction means for reproducing the data recorded on the recording medium, storage means for storing the data reproduced by the reproduction means, and control means for controlling the reproduction means so that the reproduction means jumps to a position corresponding to a value necessary to prevent the storage means from becoming empty within a period within which the reproduction means jumps to a next section or to another position corresponding to a value necessary for data reproduced from the recording medium to be stored by a predetermined amount into the storage means.

According to a yet further aspect of the present invention, there is provided a recording medium reproduction method for reproducing a recording medium on which data sectioned in a plurality of sections are recorded such that the data of the sections can be reproduced in an order different from an order in which the data are recorded on the recording medium, comprising the steps of reproducing the data recorded on the recording medium by means of a pickup, storing the reproduced data into a buffer memory, and causing the pickup to jump to a position corresponding to a value necessary to prevent the buffer memory from becoming empty within a period within which the pickup jumps to a next section or to another position corresponding to a value necessary for data reproduced from the recording medium to be stored by a predetermined amount into the buffer memory.

In the recording medium reproduction apparatus and the recording medium reproduction method, jumping is performed to a position corresponding to a value calculated in order to prevent the storage means or buffer memory from becoming empty or another position corresponding to another value calculated from a capacity which allows data to be stored by a predetermined amount into the storage means or buffer memory. Consequently, the data recorded on the recording medium can be reproduced in an order different from the order in which the data are recorded on the recording medium without suffering from interruption.

According to a yet further aspect of the present invention, there is provided a recording medium reproduction apparatus for reproducing a recording medium on which data sectioned in a plurality of sections are recorded such that the data of the sections can be reproduced in an order different from an order in which the data are recorded on the recording medium, comprising reproduction means for reproducing the data recorded on the recording medium, storage means for storing the data reproduced by the reproduction means and inputted thereto at an input rate and outputting the data at an output rate lower than the input rate, and control means for causing the reproduction means to jump to a predetermined position, the storage means having a capacity at least corresponding to a sum of a time required for the jumping of the reproduction means and a data waiting time corresponding to a processing unit for error correction of the data.

According to a yet further aspect of the present invention, there is provided a recording medium reproduction method for reproducing a recording medium on which data sectioned in a plurality of sections are recorded such that the data of the sections can be reproduced in an order different from an order in which the data are recorded on the recording medium, comprising the steps of reproducing the data recorded on the recording medium by means of a pickup, storing the data reproduced from the recording medium and inputted thereto at an input rate once into a buffer memory which has a capacity at least corresponding to a sum of a time required for the jumping of the pickup and a data waiting time corresponding to a processing unit for error correction of the data, and outputting the data stored in the buffer memory at an output rate lower than the input rate.

In the recording medium reproduction apparatus and the recording medium reproduction method, the capacity of the storage means or buffer memory is set in response to a sum of a time required for jumping of the reproduction means or pickup and a data waiting time corresponding to a processing unit for error correction, and reproduced data are stored once into the buffer memory having the capacity thus set. Then, the stored data are outputted at the output rate lower than the input rate. Consequently, the data recorded on the recording medium can be reproduced in an order different from an order in which the data are recorded on the recording medium without suffering from interruption.

According to a yet further aspect of the present invention, there is provided a data production apparatus for producing data to be reproduced by a reproduction apparatus, comprising first means for calculating a maximum length of data with which a buffer memory of the reproduction apparatus for temporarily storing the data reproduced by the reproduction apparatus does not become empty within a period within which no data are inputted to the buffer memory, second means for sectioning the data into a plurality of units in response to the first means, and third means for interleaving the data unit by unit and outputting the interleaved data.

According to a yet further aspect of the present invention, there is provided a data production method for producing data to be reproduced by a reproduction apparatus, comprising the first step of calculating a maximum length of data with which a buffer memory of the reproduction apparatus for temporarily storing the data reproduced by the reproduction apparatus does not become empty within a period within which no data are inputted to the buffer memory, the second step of sectioning the data into a plurality of units in response to the calculated maximum length of data, and the third step of interleaving the data unit by unit and outputting the interleaved data.

In the data production apparatus and the data production method, data are sectioned into a plurality of units in response to the maximum length of data with which the buffer memory of the reproduction apparatus does not become empty within a period within which no data are inputted to the buffer memory. Then, the data are interleaved unit by unit and outputted in the interleaved condition so that they may be recorded on a recording medium. Consequently, the data can be reproduced in an order different from the order in which the data are recorded on the recording medium without suffering from interruption.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 5 is a diagrammatic view illustrating a bit stream wherein an ECC block is used as a unit.

FIGS. 6A, 6B, 7A, 7B and 8 are flow charts illustrating operation of a scheduler shown in FIG. 1;

FIG. 11 is a diagram illustrating a relationship between a time required for jumping and a sector number;

FIG. 12 is a diagrammatic view illustrating operation of skipping a sectioned block;

FIG. 13 is a diagrammatic view illustrating a storage capacity of a jump buffer memory of the recording data reproduction apparatus of FIG. 1 in a jumping operation;

FIG. 18 is a view illustrating a manner in which blocks are reproduced in a different order from the order in which they are recorded.

DESCRIPTION OF THE PREFERRED EMBODIMENTS

Figure 1:
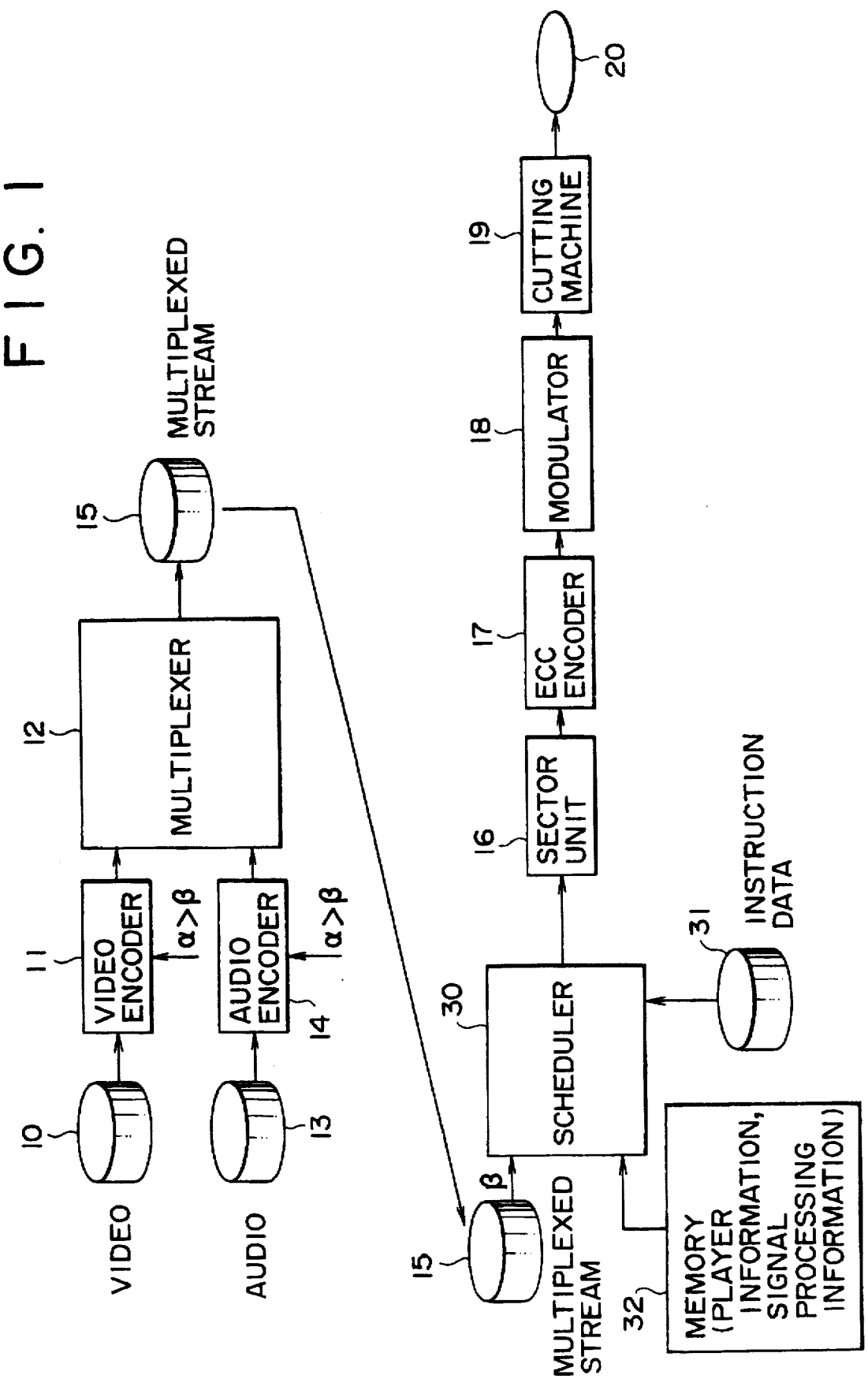
FIG. 1 is a block diagram of an encoder to which a recording data production apparatus according to the present invention is applied.
Figure 16:
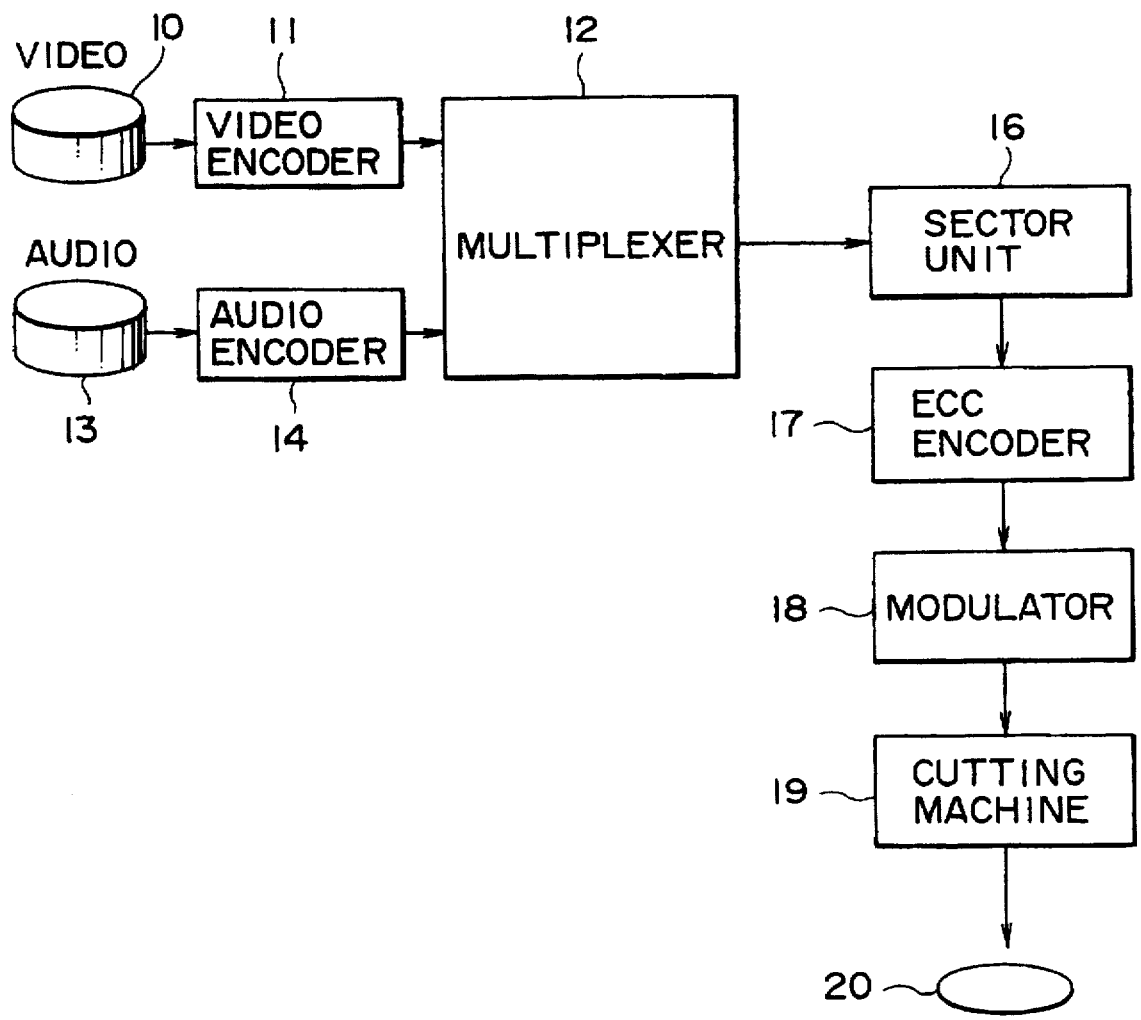
FIG. 16 is a block diagram showing of a typical encoder.

FIG. 1 shows an encoder to which a recording data production apparatus according to the present invention is applied. Referring to FIG. 1, the encoder shown includes all of the components of the encoder described hereinabove with reference to FIG. 16. Overlapping description of the common components is omitted here to avoid redundancy. The present encoder is different from the encoder of FIG. 16 in that a multiplexed stream of video data and audio data produced by and outputted from the multiplexer 12 is suitably stored into a storage apparatus 15.

The multiplexed stream stored in the storage apparatus 15 is suitably read out therefrom and inputted to a scheduler 30 serving as sectioning means. Also a memory 32 serving as storage means is connected to the scheduler 30, and player information such as a capacity of a ring buffer memory 57 of an optical disk apparatus which will be hereinafter described with reference to FIG. 14, a speed of a pickup 51 upon track jumping, an input rate of data when data reproduced from an optical disk 50 are inputted to the ring buffer memory 57, a maximum value of a latency time of the optical disk 50, and a reproduction time per one sector and signal processing information such as a construction of an ECC block formed by the ECC encoder 17 of the encoder are stored in advance in the memory 32. Such information is read out from the memory 32 and supplied to the scheduler 30. Further, a storage apparatus 31 is connected to the scheduler 30, and instruction data which indicate a reproduction order of video data to be recorded are stored in the storage apparatus 31. The stored information of the memory 32 and the storage apparatus 31 is stored in advance by a person who manually operates the encoder.

The scheduler 30 performs scheduling processing for a multiplexed stream inputted thereto from the storage apparatus 15 in response to the stored information of the memory 32 and the storage apparatus 31, and outputs resulting data to the sector unit 16.

In operation, video data read out from the storage apparatus 10 are inputted to the video encoder 11, by which they are encoded in accordance with the MPEG2 video standards, whereafter they are inputted to the multiplexer 12. Meanwhile, audio data corresponding to the video data are read out from the storage apparatus 13 and inputted to the audio encoder 14, by which they are encoded in accordance with the MPEG audio standards, whereafter they are inputted to the multiplexer 12. The multiplexer 12 time division multiplexes the video data inputted thereto from the video encoder 11 and the audio data inputted thereto from the audio encoder 14 to produce data in the form of a multiplexed stream and supplies and stores the multiplexed stream to and into the storage apparatus 15.

It is to be noted that instructions are inputted to the video encoder 11 and the audio encoder 14 so that the bit rate $\beta$ of the multiplexed stream may be sufficiently lower than the input rate $\alpha$ at which data are reproduced from the optical disk 50 of the optical disk apparatus and inputted to the ring buffer memory 57.

The multiplexed stream read out from the storage apparatus 15 is inputted to the scheduler 30. The scheduler 30 sections the multiplexed stream inputted thereto in response to the instruction data inputted thereto from the storage apparatus 31. Then, the scheduler 30 effects processing of determining the length of the sections in response to the information stored in the memory 32.

Figure 2:
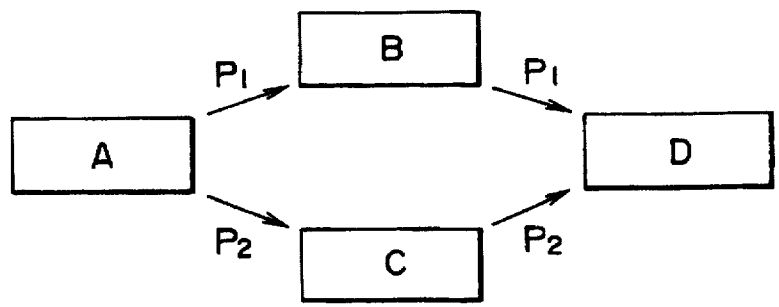
FIG. 2 is a diagrammatic view illustrating orders in which data may be reproduced.
Figure 3:
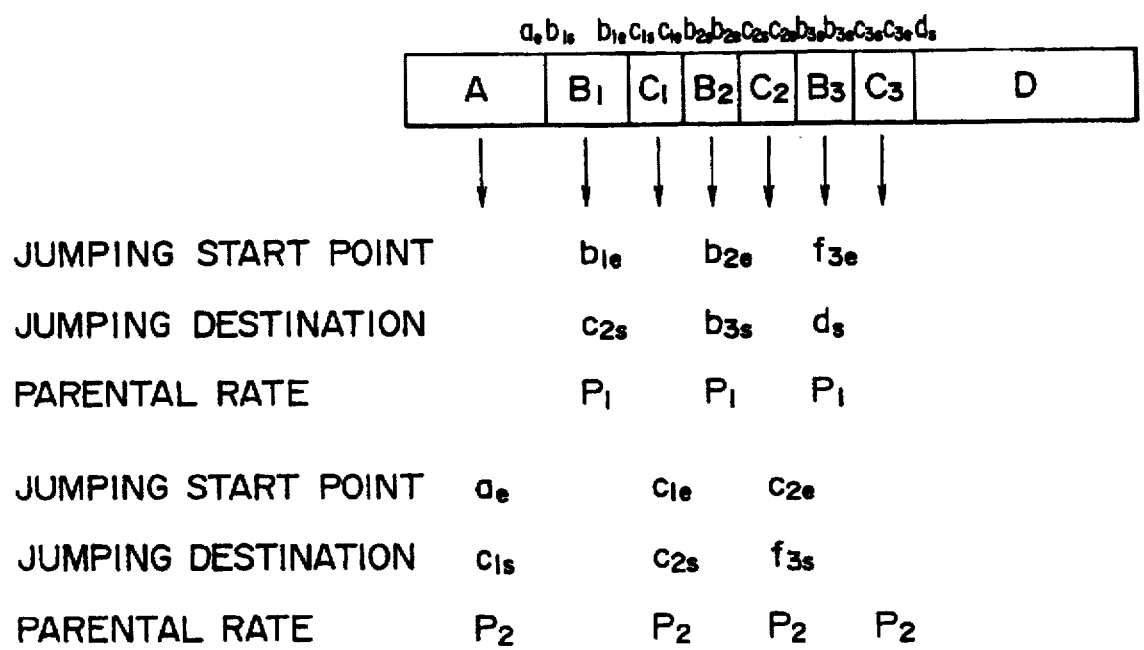
FIG. 3 is a diagrammatic view illustrating a method of sectioning and recording data by the encoder of FIG. 1.

For example, where the instruction data inputted from the storage apparatus 31 indicate an instruction order to reproduce, as shown in FIG. 2, the blocks in the order of the block A, the block B and the block D (where the parental rate is $P_1$) and another instruction order to reproduce the blocks in the order of the block A, the block C and the block D (where the parental rate is $P_2$), the scheduler 30 sections the block B into a predetermined number of blocks $B_1$ to $B_3$ and sections the block C into a predetermined number of blocks $C_1$ to $C_3$ as shown in FIG. 3, and arranges, in the bit stream, the blocks in the order of the blocks $B_1$, $C_1$, $B_2$, $C_2$, $B_3$ and $C_3$ following the block A and arranges the block D following them.

Thus, when the bit stream is reproduced after it is recorded onto the optical disk 50 (optical disk 20), either it is reproduced in the order of the block A and the blocks $B_1$, $B_2$, $B_3$ and D or in the other order of the blocks A, $C_1$, $C_2$, $C_3$ and D. In particular, where the sector addresses at start points at the boundaries between the blocks A, $B_1$, $C_1$, $B_2$, $C_2$, $B_3$, $C_3$ and D are $a_s$, $b_{1s}$, $c_{1s}$, $b_{2s}$, $c_{2s}$, $b_{3s}$, $c_{3s}$ and $d_s$, and the sector addresses of end points at the boundaries are $a_e$, $b_{1e}$, $c_{1e}$, $b_{2e}$, $c_{2e}$, $b_{3e}$, $c_{3e}$ and $d_e$, when reproduction is to be effected in the order of the blocks A, B and D, after reproduction of the blocks A and $B_1$ is effected, jumping is performed from the address $b_{1e}$ to the address $b_{2s}$ and the block $B_2$ is reproduced. Then, jumping from the address $b_{2e}$ of the end point of the block $B_2$ to the address $b_{3s}$ of the start point of the block $B_3$ is performed and the block $B_3$ is reproduced. Thereafter, jumping from the address $b_{3e}$ of the end point of the block $B_3$ to the address $d_s$ of the start point of the block D is performed and the block D is reproduced.

On the other hand, when reproduction is to be performed in the order of the block A, the block C and the block D, jumping from the address $a_e$ of the end point of the block A to the address $c_{1s}$ of the start point of the block $C_1$ is performed and the block $C_1$ is reproduced. Then, jumping from the address $c_{1e}$ of the end point of the block $C_1$ to the address $c_{2s}$ of the start point of the block $C_2$ is performed and the block $C_2$ is reproduced. Further, jumping from the address $c_{2e}$ of the end point of the block $C_2$ to the address $c_{3s}$ of the start point of the block $C_3$ is performed and reproduction is performed in order of the blocks $C_3$ and D.

In order to make it possible for such reproduction to be performed automatically in response to a parental rate with the optical disk apparatus, as the data of the block A, for example, as control information such as entry point information, the parental rate $P_2$ is recorded, and as a sector address of a start point of jumping, $a_e$ is recorded, and then as a sector address of a destination of jumping, $c_{1s}$ is recorded, all by the scheduler 30. Thereafter, the parental rate $P_1$, a jumping start point address $b_{1e}$ and a jumping destination address $b_{2s}$ are recorded into the block $B_1$; the parental rate $P_2$, a jumping start point address $c_{1e}$ and a jumping destination address $c_{2s}$ are recorded into the block $C_1$; the parental rate $P_1$, a jumping start point address $b_{2e}$ and a jumping destination address $b_{3s}$ are recorded into the block $B_2$; the parental rate $P_2$, a jumping start point address $c_{2e}$ and a jumping destination address $c_{3s}$ are recorded into the block $C_2$; the parental rate $P_1$, a jumping start point address $b_{3e}$ and a jumping destination address $d_s$ are recorded into the block $B_3$; and the parental rate $P_2$ is recorded into the block $C_3$. In the optical disk apparatus, it is possible to control, based on the information, so that jumping is performed to a jumping destination address when a current address reaches a jumping start point address.

Figure 6B:
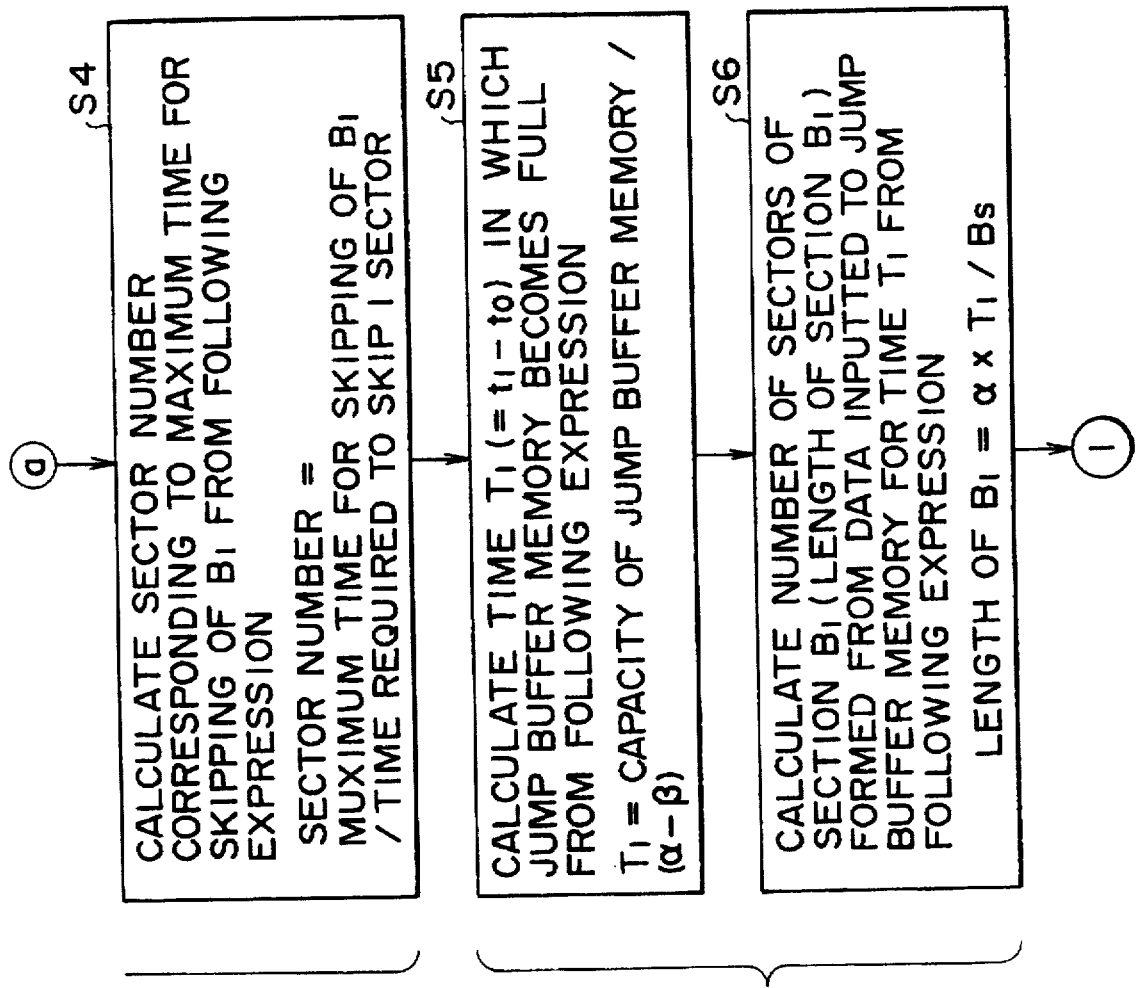
Figure 7A:
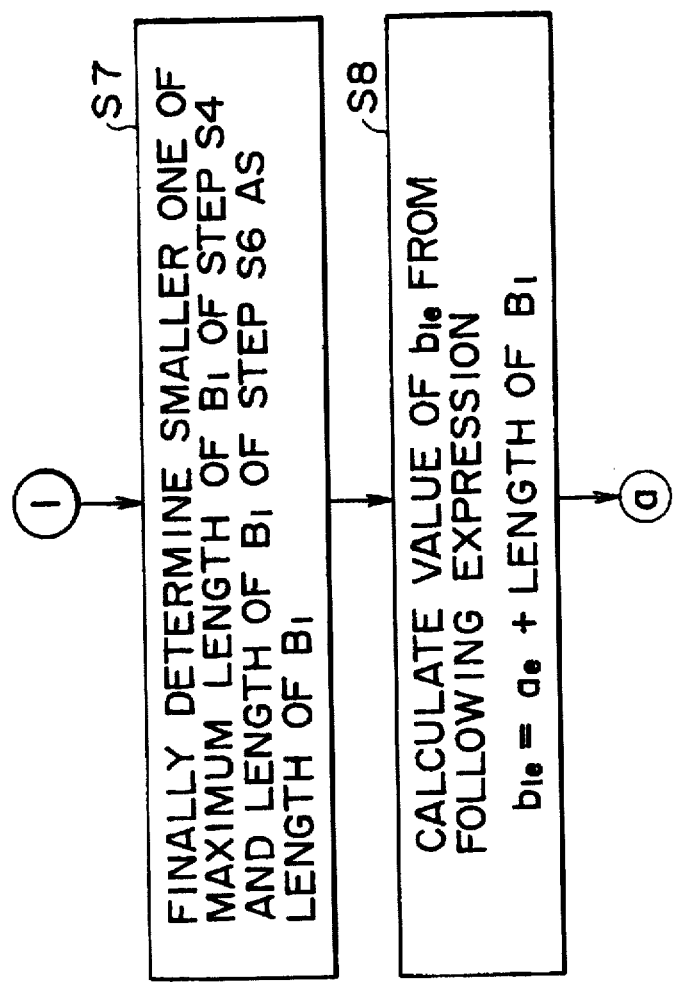
Figure 7:
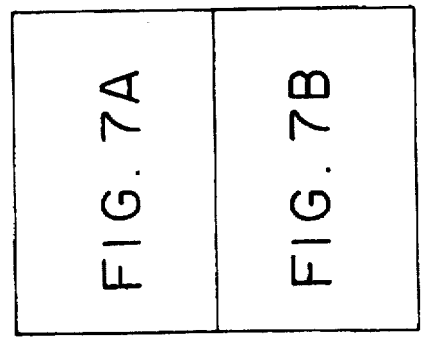
Figure 7B:
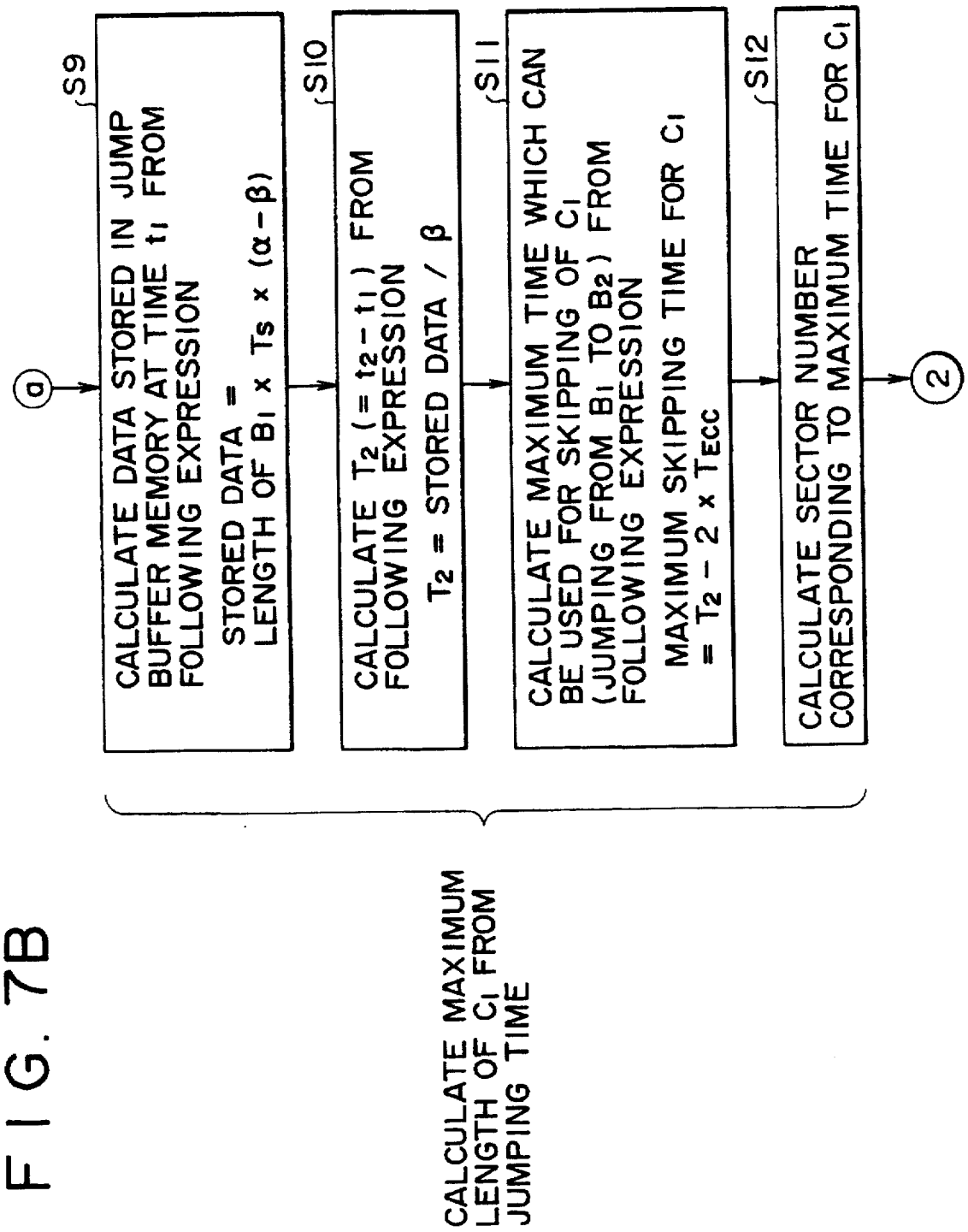
Figure 8:
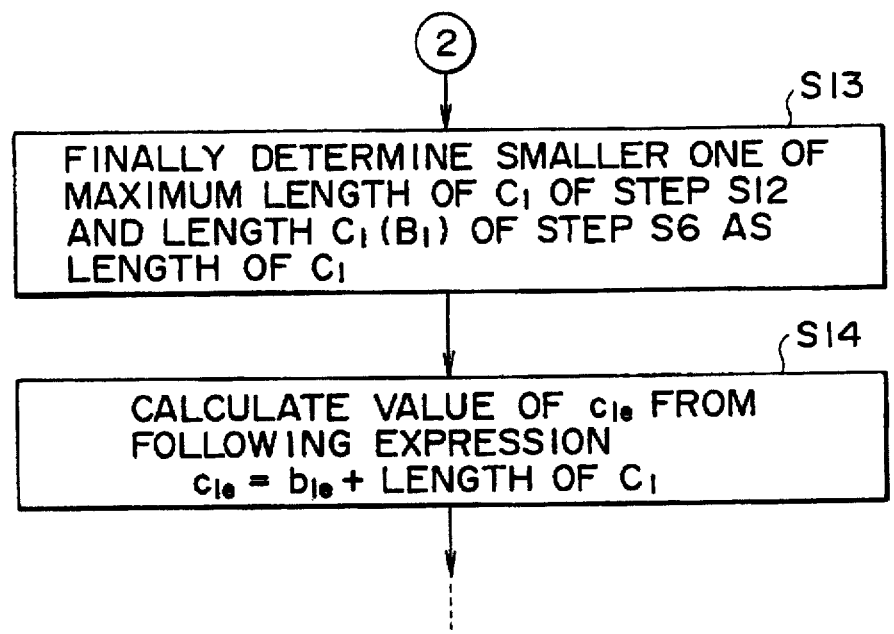

It is to be noted that a method of determining the length of sections when a data block is sectioned into a plurality of sections will be hereinafter described with reference to the flow charts of FIGS. 6 to 8.

The sector unit 16 sections the data inputted thereto from the scheduler 30 (data sectioned in a predetermined number of sections and arranged in a predetermined order as shown in FIG. 3) into sectors each including data of 2,048 bytes and adds a sector address to each of the sectors. The ECC encoder 17 forms, in response to data inputted thereto from the sector unit 16, 16 sectors of the data into one ECC block and adds parity codes for detection and correction of errors to the ECC block.

Figure 4:
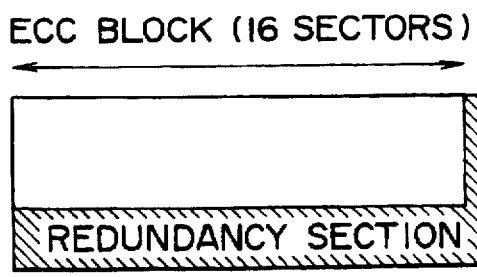
FIG. 4 is a diagrammatic view illustrating an ECC block.

In particular, as shown in FIG. 4, the ECC encoder 17 adds an ECC (redundancy) section including inner codes and outer codes to the data of 16 sectors. Then, as shown in FIG. 5, data of each ECC block (data of 16 sectors indicated by the number 1 to the number 16) are outputted in order to the modulator 18.

The modulator 18 modulates the data inputted thereto and outputs the modulated data to the cutting machine 19. The cutting machine 19 cuts the optical disk 20 in response to the data inputted thereto.

Then, the optical disk 20 is developed, and a stamper is produced using the optical disk 20 as an original disk. Then, a large number of replica disks which may be used for the optical disk 50 are produced from the stamper.

Subsequently, a method of determining a length of sections of data will be described with reference to the flow charts of FIGS. 6 to 8.

Figure 9:
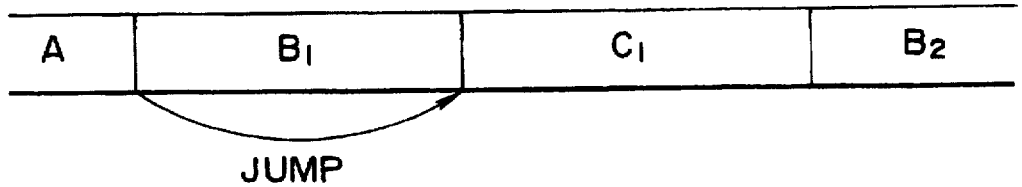
FIG. 9 is a diagrammatic view illustrating an order in which data are reproduced.

First, the length of the block $B_1$ is determined. As seen in FIG. 9, the block $B_1$ is skipped after the block A is reproduced. If skipping is performed, then the data can not be reproduced during the skipping. Accordingly, during the skipping, data stored in the ring buffer memory 57 (jump buffer memory 91) are read out. However, in order to prevent missing of data during the skipping, the length of the block $B_1$ must be set to a length with which the skipping is completed before the stored data of the jump buffer memory 91 are used up. Therefore, the maximum length of the block $B_1$ for preventing the ring buffer memory 57 from becoming empty is calculated first.

To this end, in step S1, the scheduler 30 calculates a capacity of the jump buffer memory from the following expression (1):

Capacity of jump buffer memory=capacity of ring buffer memory– $\beta$×maximum value of latency time  (1)

Figure 14:
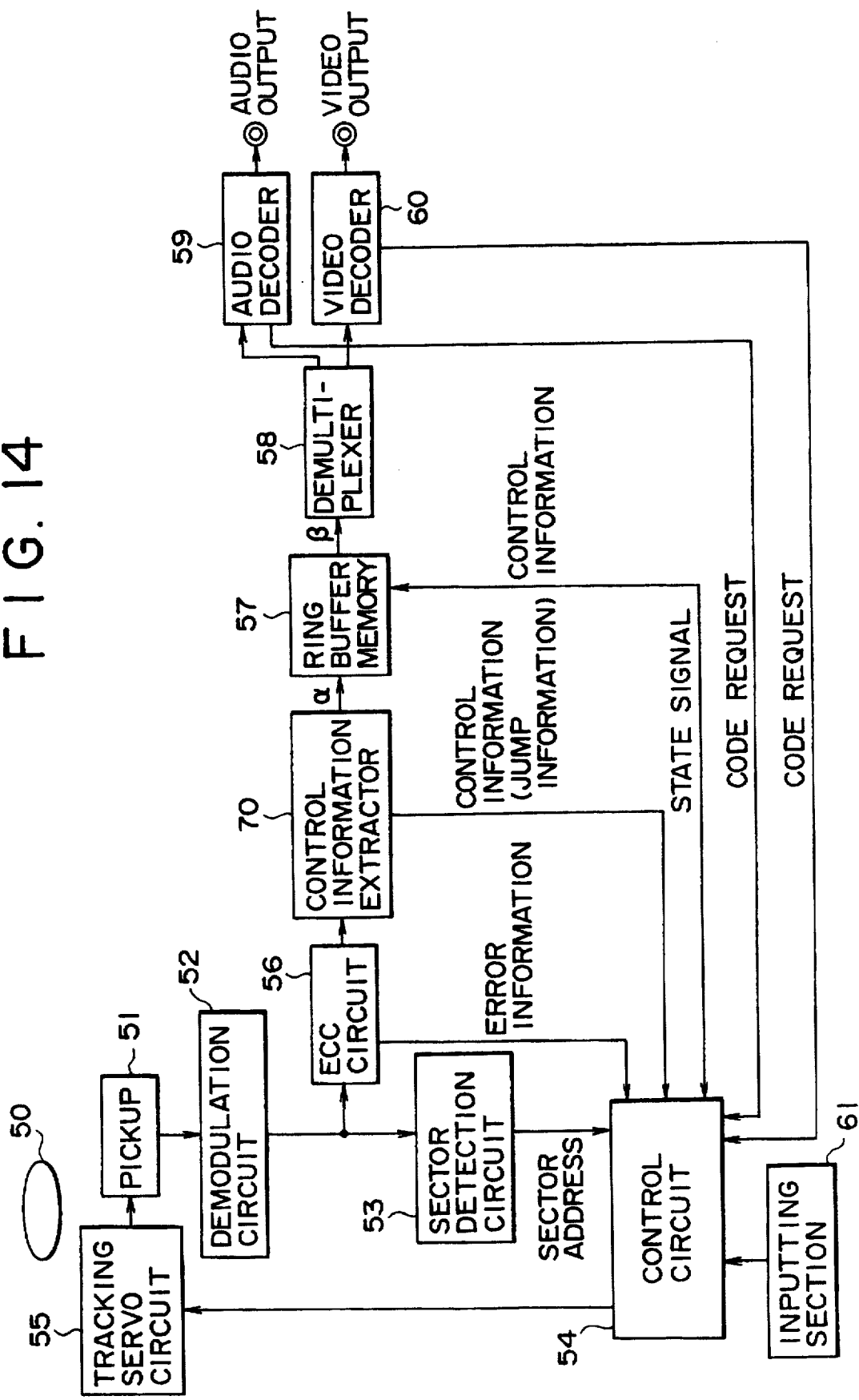
FIG. 14 is a block diagram of an optical disk apparatus to which a recording medium reproduction apparatus according to the present invention is applied.
Figure 15:
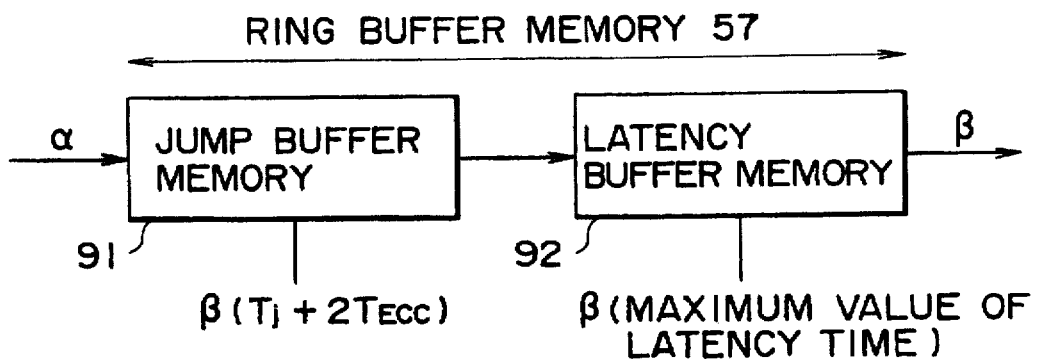
FIG. 15 is a block diagram of a ring buffer memory shown in FIG. 14.

In particular, in the present embodiment, the ring buffer memory 57 of the optical disk apparatus which will be hereinafter described in detail with reference to FIG. 14 includes, as shown in FIG. 15, a jump buffer memory 91 and a latency buffer memory 92. The jump buffer memory 91 is provided to prevent interruption of data even when sectioned data are skipped as described hereinabove with reference to FIG. 3. Meanwhile, the latency buffer memory 92 has a capacity for a maximum one track (maximum value of $\beta$×latency time). Consequently, even when one track jumping is performed in the optical disk apparatus, data are prevented from missing.

Accordingly, the capacity of the jump buffer memory 91 can be calculated from the expression (1) given hereinabove. It is to be noted that $\beta$ in the expression (1) above represents the output rate of a beat stream read out from the ring buffer memory 57 (latency buffer memory 92).

The capacity of the ring buffer memory 57 and the maximum value of the latency time are stored in advance in the memory 32 as described hereinabove. The scheduler 30 can read out the stored values and calculate the capacity of the jump buffer memory 91 from the expression (1) given hereinabove.

While the capacity of the jump buffer memory is calculated from the expression (1) above in step S1, where the capacity of the jump buffer memory is defined in advance, this may alternatively be stored in the memory 32 and read out from it.

The block $B_1$ is skipped immediately after the block A is reproduced. Since the block A has a sufficiently large length, it can be considered that the jump buffer memory 91 immediately after the block A is reproduced has data stored fully therein.

Thus, the control advances to step S2, in which a time (compensation time) in which the data stored fully in the jump buffer memory 91 are read out until the jump buffer memory 91 becomes empty is calculated from the following expression (2):

Compensation time=capacity of jump buffer memory/$\beta$  (2)

Since the block A is sufficiently long, if the data of the block A are reproduced and stored into the jump buffer memory 91, then the data are stored into the jump buffer memory 91 until the jump buffer memory 91 becomes full. If it is assumed that the data are read out at the output rate $\beta$, then the time (compensation time) in which the fully stored data are used up can be calculated from the expression (2) above.

Then, the control advances to step S3, in which a maximum time which can be used to skip the block $B_1$ (to perform jumping from the block A to the block $C_1$) is calculated from the following expression (3):

Maximum time for skipping $B_1$=compensation time–2×$T_{ECC}$×compensation time–30×$Ts$  (3)

Here, $T_{ECC}$ represents a time required to process an ECC block (more accurately, a time required to perform processing for 15 sectors as hereinafter described), and $Ts$ represents a time required to reproduce data for one sector.

Figure 10:
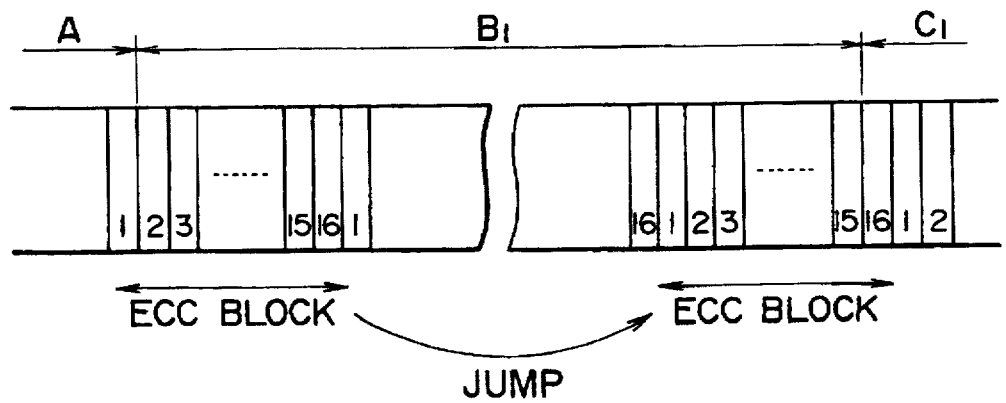
FIG. 10 is a diagrammatic view illustrating a relationship between an ECC block and a jumping operation of the recording data production apparatus of FIG. 1.

In particular, as shown in FIG. 4, error correction is performed in units of an ECC block formed from 16 sectors. As a result, if, for example, the last sector of the block A is a sector of the number 1 from within the 16 sectors of the number 1 to the number 16 of the ECC block as shown in FIG. 10, then in order to effect error correction of the data of the 1 sector, also the data of the other 15 sectors of the ECC block of the number 2 to the number 16 following the sector of the number 1. Accordingly, jumping cannot be performed until after the data of the following 15 sectors are fetched.

On the other hand, when, as shown in FIG. 10, the top sector of the sectioned block $C_1$ of the destination of the jumping is the last sector of the number 16 from within the sectors of the number 1 to the number 16 of the ECC block, in order to effect error correction of the sector, also the data of the 15 sectors of the number 1 to the number 15 preceding to the sector of the number 16 are required. Accordingly, the time which can be used for skipping of the section $B_1$ is a value obtained by subtracting a value twice the time $T_{ECC}$ (=15×Ts) required to read data for 15 sectors from the compensation time.

Thereafter, the control advances to step S4, in which the maximum time which can be used for skipping of the section $B_1$ calculated in step S3 is converted into a corresponding distance (sector number). This conversion can be performed from a minimum jumping speed determined as a standard for the pickup of the optical disk apparatus.

In particular, by dividing the maximum skipping time of the section $B_1$ calculated in step S3 by the minimum jumping speed (time required to jump by one track distance) determined as a standard for the pickup of the optical disk apparatus, a sector number corresponding to the maximum skipping time for the section $B_1$ can be calculated.

Actually, however, since a plurality of sectors are arranged in one track (one rotation), if one track jumping is performed, then a plurality of sectors are skipped at a time.

For example, if it is assumed that $N_0$ sectors are provided for one rotation and a time $T_0$ is required to effect jumping by one track distance, then the relationship between the time t required for jumping and the sector number exhibits such a stepwise variation as shown in FIG. 11. Thus, for example, where the maximum skipping time for the section $B_1$ calculated in step S3 is $t_{21}$, the corresponding sector number is a sector number $N_2$ which can be skipped in a time $t_{12}$ shorter than the time $t_{21}$.

By the processing in steps S1 to S4 (which serves as first calculation means) described above, a maximum length is calculated which can be used as a length of the section $B_1$ from the point of view of preventing the data having been stored immediately prior to jumping into the jump buffer memory 91 from being used up.

When the sectioned block $C_1$ is to be skipped as seen in FIG. 12, stored data of the section $B_1$ are read out from the jump buffer memory 91. In order to make the length of the section $C_1$ long, preferably the jump buffer memory 91 is full of the data of the section $B_1$ when jumping is to be performed (because the skipping time for the section $C_1$ can be set longer as much). Thus, the length of the section $B_1$ necessary to make the jump buffer memory 91 full is calculated subsequently.

To this end, the control advances to step S5, in which the time $T_1(=t_1-t_0)$ in which the jump buffer memory 91 becomes full is calculated from the following expression (4):

$$T_1 = \text{capacity of jump buffer memory}/(\alpha-\beta) \qquad (4)$$

In particular, since the input rate of the jump buffer memory 91 is $\alpha$ and the output rate is $\beta$, the time $T_1$ in which the jump buffer memory 91 becomes full can be calculated from the expression (4) above.

Thereafter, the control advances to step S6, in which the capacity for data (the number of sectors of the section $B_1$) inputted to the jump buffer memory 91 for the time $T_1$ is calculated from the following expression (5):

$$\text{Length of } B_1 = \alpha \times T_1/Bs \qquad (5)$$

where $Bs$ is the amount of data of one sector.

In particular, when the data of the section $B_1$ are inputted to the jump buffer memory 91 as seen in FIG. 13, since the input rate is $\alpha$ and the output rate is $\beta$, writing into the jump buffer memory 91 is performed at the rate of $\alpha-\beta$ from time $t_0$, and the writing of the data of the section $B_1$ is completed at time $t_1$. Thereafter, data of the section $B_1$ are read out at the output rate $\beta$, and the jump buffer memory 91 becomes empty at time $t_2$. Skipping of the section $C_1$ must be performed within a period from time $t_1$ to time $t_2$, and the data amount of the section $B_1$ to assure this period is calculated from the expression (5) above.

By the processing in steps S5 and S6 (which serve as second calculation means) described above, the length of the section $B_1$ required to make the jump buffer memory 91 full is calculated.

It is to be noted that the length calculated in steps S5 and S6 is a maximum value not only for the section $B_1$ but common to the sections and is used also to determine the length of any section other than the section $B_1$.

Further, where the length of each section need not be set very long, a length required to store data by a predetermined amount (for example, by an amount equal to 90% the full amount) into the jump buffer memory 91 may be calculated in steps S5 and S6.

Subsequently, the control advances to step S7, in which a smaller one of the maximum length of the section $B_1$ required to prevent the jump buffer memory 91 calculated in step S4 from becoming empty and the length of the section $B_1$ calculated in step S6 for making the jump buffer memory 91 full is selected and the selected length is finally determined as the length of the section $B_1$. Then, the control advances to step S8, in which the sector address $b_{1e}$ of the end point of the section $B_1$ is calculated from the following expression (6):

$$b_{1e} = a_e + \text{length of } B_1 \qquad (6)$$

Since the length of the section $B_1$ is determined in such a manner as described above, processing for determining the length of the section $C_1$ is executed subsequently. First, a maximum length which will not cause missing of data when the section $C_1$ is skipped is calculated.

To this end, in step S9, data stored in the jump buffer memory 91 at time $t_1$ of FIG. 13 is calculated from the following expression (7):

$$\text{Stored data} = \text{length of } B_1 \times Ts \times (\alpha-\beta) \qquad (7)$$

Then, in step S10, $T_2(=t_2-t_1)$ is calculated from the stored data calculated in step S9 based on the following expression (8):

$$T_2 = \text{stored data}/\beta \qquad (8)$$

Subsequently, the control advances to step S11, in which the time which can be used for skipping of the section $C_1$ (jumping from the section $B_1$ to the section $B_2$) is calculated based on the following expression (9):

$$\text{Maximum skipping time for } C_1 = T_2 - 2 \times T_{ECC} \qquad (9)$$

Further, the control advances to step S12, in which the sector number corresponding to the maximum skipping time for the section $C_1$ calculated in step S11 is calculated.

By the processing in steps S9 to S12 above, the maximum length of the section $C_2$ for preventing the jump buffer memory 91 from becoming empty can be calculated.

As described hereinabove, the maximum value of the length of a section defined from the data amount for making the jump buffer memory 91 full has been calculated already in steps S5 and S6. Therefore, the control subsequently advances to step S13, in which the maximum length of the section $C_1$ calculated in step S12 and the maximum length of the section $C_1$ (common to the sections) calculated in step S6 are compared with each other and a smaller one of the lengths is finally determined as the length of the section $C_1$.

Further, in step S14, the sector address $C_{1e}$ of the end point of the section C is calculated from the following expression (10):

$$C_{1e} = b_{1e} + \text{length of } C_1 \qquad (10)$$

Thereafter, the lengths of the sections from the section $B_2$ to the section $C_3$ are calculated in a similar manner. Description of the calculation is omitted here to avoid redundancy.

Figure 17:
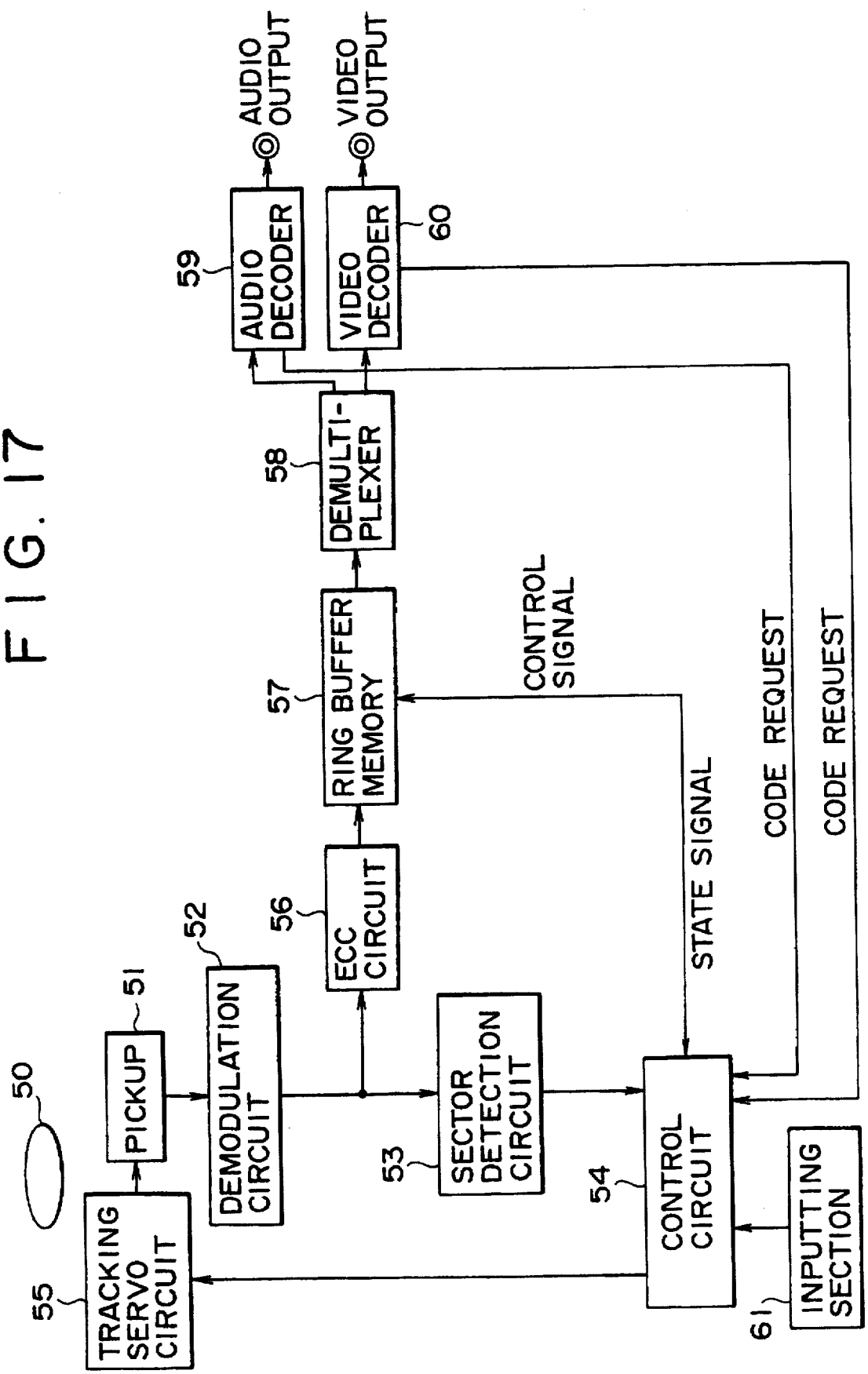
FIG. 17 is a block diagram showing a typical optical disk apparatus.

FIG. 14 shows an optical disk apparatus which reproduces the optical disk 50 formed in such a manner as described above. Referring to FIG. 14, the optical disk apparatus includes all of the components of the optical disk apparatus described hereinabove with reference to FIG. 17. Overlapping description of the common components is omitted here to avoid redundancy.

In the present optical disk apparatus, an output of the ECC circuit 56 is inputted to a control information extractor 70. The control information extractor 70 extracts control information (jump information and parental rate information) described hereinabove with reference to FIG. 3 from the data inputted thereto and outputs the extracted control information to the control circuit 54 which serves as control means. The control information extractor 70 outputs data of the information inputted thereto from the ECC circuit 56 except the control information to the ring buffer memory 57 so that the data may be stored into the ring buffer memory 57. The ring buffer memory 57 is formed from, as shown in FIG. 15, ring buffer memory 91 serving as storage means and a latency buffer memory 92 serving as the storage means.

The jump buffer memory 91 has a capacity represented by the following expression (11) where the jumping time of the pickup 51 is $T_j$:

$$\text{Capacity of jump buffer memory } 91 = \beta(T_j + 2 \times T_{ECC}) \qquad (11)$$

Meanwhile, the latency buffer memory 92 is set to a capacity represented by the following expression (12):

$$\text{Capacity of latency buffer memory } 92 = \beta \times \text{maximum value of latency time} \qquad (12)$$

In operation, the pickup 51 serving as reproduction means irradiates a laser beam upon the optical disk 50 and reproduces data recorded on the optical disk 50 from reflected light of the laser beam from the optical disk 50. A reproduction signal outputted from the pickup 51 is inputted to and demodulated by the demodulation circuit 52. The data demodulated by the demodulation circuit 52 are inputted to the sector detection circuit 53, by which a sector address is detected. Meanwhile, the control circuit 54 discriminates a current position of the pickup 51 from the sector address supplied thereto from the sector detection circuit 53. If the current position is not a desired position, the control circuit 54 controls the tracking servo circuit 55 to feed the pickup 51 to a predetermined sector address position. Consequently, data recorded at the predetermined position of the optical disk 50 are reproduced by the pickup 51.

The data outputted from the demodulation circuit 52 are inputted to the ECC circuit 56, by which detection and correction of errors of them are performed, whereafter they are inputted to and stored into the ring buffer memory 57. The data stored in the ring buffer memory 57 are read out again from the ring buffer memory 57 and inputted to the demultiplexer 58. The demultiplexer 58 demultiplexes the data inputted thereto into audio data and video data, and outputs the audio data to the audio decoder 59 and outputs the video data to the video decoder 60. The audio decoder 59 decodes the audio data inputted thereto and outputs the decoded audio data to the loudspeaker not shown. Meanwhile, the video decoder 60 decodes the video data inputted thereto and outputs the decoded video data to the monitor apparatus not shown.

Each of the audio decoder 59 and the video decoder 60 outputs a code request signal to the control circuit 54 when its decoding processing is completed. The control circuit 54 controls the latency buffer memory 92 in response to the code request signals to read out data stored in the latency buffer memory 92 and output the thus read out data to the audio decoder 59 and the video decoder 60 via the demultiplexer 58.

The control circuit 54 monitors the state signal inputted thereto from the latency buffer memory 92 and controls the position of the pickup 51 via the tracking servo circuit 55 so that the latency buffer memory 92 may not overflow or underflow.

The input rate of data to the latency buffer memory 92 is set so as to have a value sufficiently higher than the output rate. The latency buffer memory 92 has a capacity at least corresponding to a maximum latency time of the optical disk 50 (where the optical disk 50 is a CLV disk, a capacity for one rotation on an outermost circumference) so that data of a variable rate inputted to the latency buffer memory 92 may be outputted continuously at a predetermined output rate.

Further, operation of the latency buffer memory 92 will be described.

If, for example, a track jumping instruction to effect jumping back is outputted from the control circuit 54, then the tracking servo circuit 55 causes the reproduction position by the pickup 51 to a position on the inner circumference side by one track distance. Then, the control circuit 54 inhibits writing of new data into the ring buffer memory 57 (latency buffer memory 92) for a time until the optical disk 50 makes one rotation again so that the reproduction position returns to the position prior to the jumping, that is, for a time until the sector number obtained from the sector detection circuit 53 returns to the number of the sector from which the track jumping has been performed. Then, data stored already in the latency buffer memory 92 are transferred to the audio decoder 59 and the video decoder 60 via the demultiplexer 58 in accordance with the necessity.

Further, even if the sector number obtained from the sector detection circuit 53 after the track jumping becomes coincident with the sector number from which the track jumping has been performed, when the amount of data stored in the latency buffer memory 92 exceeds a predetermined reference value, that is, when the latency buffer memory 92 may possibly overflow, writing of data into the latency buffer memory 92 is not resumed, but tracking jumping is performed again.

For a time until the optical disk 50 makes one rotation and the original reproduction position is restored after track jumping by one track distance is performed, writing of new data into the latency buffer memory 92 is not performed. Consequently, a time longer only by the time of the track jumping is required to effect transfer of data to the latency buffer memory 92, and accordingly, the average transfer rate $\alpha$ to the latency buffer memory 92 fluctuates at values lower than the maximum average transfer rate $\alpha m$.

Here, the latency buffer memory 92 at least has a capacity with which it can store data at least for one track (one rotation) of the optical disk 50, that is, a storage capacity of (maximum rotation period of optical disk 50)×$\alpha m$. Consequently, where the optical disk 50 is, for example, a CLV disk, since the period of rotation exhibits a maximum value at an outermost circumference thereof, the latency buffer memory 92 at least has a storage capacity for one track (one rotation) on the outermost circumference, that is, the storage capacity of (period of rotation of outermost circumference)×$\alpha m$.

Where the maximum transfer rate from the latency buffer memory 92 to the demultiplexer 58 is represented by $\beta m$, $\beta m$ is set to a value equal to or lower than $\alpha m$ ($\beta m \leq \alpha m$). Where the maximum transfer rate is set in this manner, a code request for data transfer from the audio decoder 59 or the video decoder 60 to the latency buffer memory 92 (via the control circuit 54) can be sent out freely irrespective of the timing of track jumping.

Where $\beta m$ is considerably lower than $\alpha m$, for example, equal to approximately one half the value $\alpha m$, since the amount of data written into the latency buffer memory 92 is larger than the amount of data read out from the latency buffer memory 92, a condition wherein the latency buffer memory 92 is almost full continues. On the other hand, where the optical disk 50 is a CLV disk, the amount of data reproduced when the optical disk 50 makes one rotation is considerably different between an inner circumference and an outer circumference thereof. If the storage amount of the latency buffer memory 92 is adjusted to an outermost circumference of the optical disk 50 with which the data amount is largest as described above, then the storage capacity of the latency buffer memory 92 has a considerable room at an inner circumference of the optical disk 50. Accordingly, when an uncorrectable error is detected by the ECC circuit 56, the possibility in which recovery against the error can be performed is increased by performing jumping back to fetch the same data again and performing error detection and correction processing again.

It is to be noted that the latency buffer memory 92 has the same function as that of a ring buffer memory proposed by the present applicant in Japanese Patent Laid-Open No. Hei 4-92223.

Meanwhile, the control information extractor 70 extracts control information from information outputted from the ECC circuit 56 and outputs the control information to the control circuit 54. When the parental rate inputted from the control information extractor 70 and the parental rate of a current viewer inputted from the inputting section 61 are coincident with each other, the control circuit 54 controls, if the sector address inputted from the sector detection circuit 53 (the address of a sector being accessed at present by the pickup 51) becomes coincident with the sector address of the jumping start point extracted by the control information extractor 70, the pickup 51 via the tracking servo circuit 55 to cause the pickup 51 to jump to the sector address of the jumping destination defined in the control information extracted by the control information extractor 70.

In particular, when a predetermined parental rate is inputted from the inputting section 61, the control circuit 54 automatically selects a reproduction order corresponding to the input. For example, if the parental rate inputted from and set by the inputting section 61 is $P_1$ as shown in FIG. 3, the block A, then the block $B_1$, the block $B_2$, the block $B_3$ and the block D are successively reproduced in response to addresses of jumping start points and jumping destinations set corresponding to the parental rate. On the other hand, if the parental rate inputted from the inputting section 61 is $P_2$, then reproduction is performed in the order of the block A, the block $C_1$, the block $C_2$, the block $C_3$ and the block D.

While the present invention is described above by way of an example wherein data are recorded onto and reproduced from an optical disk, the present invention can be applied to a case wherein information is recorded onto and reproduced from any other recording medium.

Having now fully described the invention, it will be apparent to one of ordinary skill in the art that many changes and modifications can be made thereto without departing from the spirit and scope of the invention as set forth herein.

What is claimed is:

1. A recording data production apparatus for producing data to be recorded onto a recording medium to be reproduced by a reproduction apparatus, comprising:

storage means for storing a capacity of a buffer memory of said reproduction apparatus for storing the data, input/output rates to and from said buffer memory, a speed in track jumping of a pickup of said reproduction apparatus when the data are reproduced from the recording medium, a latency time of the recording medium and a processing time relation information of an ECC; and sectioning means for sectioning the data in response to the storage of said storage means so that said reproduction apparatus may reproduce the data in an order different from an order in which the data are recorded on the recording medium.

2. A recording data production method for producing data to be recorded onto a recording medium to be reproduced by a reproduction apparatus, comprising the steps of:

storing in advance a capacity of a buffer memory of said reproduction apparatus for storing the data, input/output rates to and from said buffer memory, a speed in track jumping of a pickup of said reproduction apparatus when the data are reproduced from the recording medium, a latency time of the recording medium and a processing time relation information of an ECC; and sectioning the data in response to the stored information so that said reproduction apparatus may reproduce the data in an order different from an order in which the data are recorded on the recording medium.

3. A recording data production apparatus which sections data into a plurality of sections and produces data to be recorded onto a recording medium to be reproduced by a reproduction apparatus so that the data of the sections may be reproduced by said reproduction apparatus in an order different from an order in which the data are recorded on the recording medium, comprising:

first calculation means for calculating a length of the sections necessary to prevent a buffer memory of said reproduction apparatus for storing the data from becoming empty within an interval within which a reproduction point is jumped to a next section;

second calculation means for calculating a length of the sections necessary for data reproduced from the recording medium to be stored by a predetermined amount into said buffer memory; and determination means for determining a length of the sections from a result of the calculation of said first calculation means and a result of the calculation of said second calculation means.

4. A recording data production method wherein data are sectioned into a plurality of sections and data to be recorded onto a recording medium to be reproduced by a reproduction apparatus so that the data of the sections may be reproduced by said reproduction apparatus in an order different from an order in which the data are recorded on the recording medium are produced, comprising the steps of:

calculating a length of the sections necessary to prevent a buffer memory of said reproduction apparatus for storing the data from becoming empty within an interval within which a reproduction point is jumped to a next section;

calculating a length of the sections necessary for data reproduced from the recording medium to be stored by a predetermined amount into said buffer memory; and determining a length of the sections from results of the two calculations.

5. A recording medium, having recorded thereon data which are sectioned in a plurality of sections such that the data of the sections can be reproduced by a reproduction apparatus in an order different from an order in which the data are recorded on the recording medium, the sections having a length determined corresponding to one of a value required to prevent a buffer memory of said reproduction apparatus for storing the data from becoming empty within an interval within which a reproduction point is jumped to a next section and another value necessary for data reproduced from the recording medium to be stored by a predetermined amount into said buffer memory.

6. A recording medium reproduction apparatus for reproducing a recording medium on which data sectioned in a plurality of sections are recorded such that the data of the sections can be reproduced in an order different from an order in which the data are recorded on the recording medium, comprising:

reproduction means for reproducing the data recorded on the recording medium;

storage means for storing the data reproduced by said reproduction means; and control means for controlling said reproduction means so that said reproduction means jumps to a position corresponding to a value necessary to prevent said storage means from becoming empty within a period within which said reproduction means jumps to a next section or to another position corresponding to a value necessary for data reproduced from the recording medium to be stored by a predetermined amount into said storage means.

7. A recording medium reproduction method for reproducing a recording medium on which data sectioned in a plurality of sections are recorded such that the data of the sections can be reproduced in an order different from an order in which the data are recorded on the recording medium, comprising the steps of:

reproducing the data recorded on the recording medium by means of a pickup;

storing the reproduced data into a buffer memory; and causing said pickup to jump to a position corresponding to a value necessary to prevent said buffer memory from becoming empty within a period within which said pickup jumps to a next section or to another position corresponding to a value necessary for data reproduced from the recording medium to be stored by a predetermined amount into said buffer memory.

8. A recording medium reproduction apparatus for reproducing a recording medium on which data sectioned in a plurality of sections are recorded such that the data of the sections can be reproduced in an order different from an order in which the data are recorded on the recording medium, comprising:

reproduction means for reproducing the data recorded on the recording medium;

storage means for storing the data reproduced by said reproduction means and inputted thereto at an input rate and outputting the data at an output rate lower than the input rate; and control means for causing said reproduction means to jump to a predetermined position;

said storage means having a capacity at least corresponding to a sum of a time required for the jumping of said reproduction means and a data waiting time corresponding to a processing unit for error correction of the data.

9. A recording medium reproduction apparatus according to claim 8, wherein the capacity of said storage means further corresponds to a product of a maximum value of the output rate and a maximum value of a latency time of the recording medium upon jumping.

10. A recording medium reproduction method for reproducing a recording medium on which data sectioned in a plurality of sections are recorded such that the data of the sections can be reproduced in an order different from an order in which the data are recorded on the recording medium, comprising the steps of:

reproducing the data recorded on the recording medium by means of a pickup;

storing the data reproduced from the recording medium and inputted thereto at an input rate once into a buffer memory which has a capacity at least corresponding to a sum of a time required for the jumping of said pickup and a data waiting time corresponding to a processing unit for error correction of the data; and outputting the data stored in said buffer memory at an output rate lower than the input rate.

11. A data production apparatus for producing data to be reproduced by a reproduction apparatus, comprising:

first means for calculating a maximum length of data with which a buffer memory of said reproduction apparatus for temporarily storing the data reproduced by said reproduction apparatus does not become empty within a period within which no data are inputted to said buffer memory;

second means for sectioning the data into a plurality of units in response to said first means; and third means for interleaving the data unit by unit and outputting the interleaved data.

12. A data production apparatus according to claim 11, wherein said third means includes means for interleaving a plurality of image data unit by unit.

13. A data production apparatus according to claim 11, wherein said first means includes means for calculating the maximum length of data with which said buffer memory does not become empty in response to a capacity of said buffer memory and an input rate of the data to said buffer memory.

14. A data production apparatus according to claim 13, wherein said first means further includes means for calculating the maximum length of data with which said buffer memory does not become empty in response to a time required for jumping of a reproduction point.

15. A data production apparatus according to claim 14, wherein said first means further includes means for calculating the maximum length of data with which said buffer memory does not become empty in response to a track jumping speed of said reproduction apparatus and a latency time of a recording medium.

16. A data production apparatus according to claim 14, wherein said first means further includes means for calculating the maximum length of data with which said buffer memory does not become empty in response to a time required for said reproduction apparatus to effect error correction processing of the data.

17. A data production apparatus according to claim 16, wherein the data has a parity added to each data block thereof of a predetermined length.

18. A data production method for producing data to be reproduced by a reproduction apparatus, comprising:

the first step of calculating a maximum length of data with which a buffer memory of said reproduction apparatus for temporarily storing the data reproduced by said reproduction apparatus does not become empty within a period within which no data are inputted to said buffer memory;

the second step of sectioning the data into a plurality of units in response to the calculated maximum length of data; and the third step of interleaving the data unit by unit and outputting the interleaved data.

19. A data production method according to claim 18, wherein the third step includes the step of interleaving a plurality of image data unit by unit.

20. A data production method according to claim 18, wherein the first step includes the step of calculating the maximum length of data with which said buffer memory does not become empty in response to a capacity of said buffer memory and an input rate of the data to said buffer memory.

21. A data production method according to claim 20, wherein the first step further includes the step of calculating the maximum length of data with which said buffer memory does not become empty in response to a time required for jumping of a reproduction point.

22. A data production method according to claim 21, wherein the first step further includes the step of calculating the maximum length of data with which said buffer memory does not become empty in response to a track jumping speed of said reproduction apparatus and a latency time of a recording medium.

23. A data production method according to claim 21, wherein the first step further includes the step of calculating the maximum length of data with which said buffer memory does not become empty in response to a time required for said reproduction apparatus to effect error correction processing of the data.

* * * * *